United States Patent
Lindsay et al.

(10) Patent No.: US 11,535,150 B2
(45) Date of Patent: Dec. 27, 2022

(54) LIGHTING SYSTEM HAVING LIGHT ASSEMBLY REMOVABLY COUPLED TO POWERING SURFACE ASSEMBLY

(71) Applicant: Honda Motor Co., Ltd., Tokyo (JP)

(72) Inventors: Derek S. Lindsay, Marysville, OH (US); Zainab I. Ali, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/150,637

(22) Filed: Jan. 15, 2021

(65) Prior Publication Data
US 2022/0227291 A1 Jul. 21, 2022

(51) Int. Cl.
| | |
|---|---|
| *B60Q 3/20* | (2017.01) |
| *F21V 21/08* | (2006.01) |
| *F21V 23/04* | (2006.01) |
| *H02J 50/12* | (2016.01) |
| *H01R 13/33* | (2006.01) |
| *H01R 13/62* | (2006.01) |
| *F21V 23/06* | (2006.01) |
| *H02J 50/10* | (2016.01) |
| *H02J 50/00* | (2016.01) |

(Continued)

(52) U.S. Cl.
CPC .............. *B60Q 3/20* (2017.02); *B60Q 3/51* (2017.02); *B60R 13/0212* (2013.01); *F21V 21/08* (2013.01); *F21V 23/04* (2013.01); *F21V 23/06* (2013.01); *H01R 13/33* (2013.01); *H01R 13/6205* (2013.01); *H02J 50/005* (2020.01); *H02J 50/10* (2016.02); *H02J 50/12* (2016.02); *B32B 5/028* (2013.01); *B32B 5/245* (2013.01); *B32B 2307/202* (2013.01)

(58) Field of Classification Search
CPC .. F21V 17/105; F21V 21/096; F21V 21/0965; H01R 13/66
See application file for complete search history.

(56) References Cited

U.S. PATENT DOCUMENTS

| | | | | |
|---|---|---|---|---|
| 2,788,501 | A | * 4/1957 | Buquor | .............. H01R 13/6205 439/39 |
| 4,231,901 | A | 11/1980 | Berbeco | |

(Continued)

FOREIGN PATENT DOCUMENTS

| | | |
|---|---|---|
| CN | 203460775 | 3/2014 |
| CN | 208368399 | 1/2019 |

(Continued)

*Primary Examiner* — Ismael Negron
(74) *Attorney, Agent, or Firm* — Rankin, Hill & Clark LLP (57) ABSTRACT

A powering surface assembly includes an electric power transfer arrangement connected to a power source, and having at least one of a conductive fabric, a conductive foam, or an inductive transmitter coil. A light assembly includes an electric power receiving arrangement, which electrically couples with the electric power transfer arrangement when the light assembly is attached to the surface assembly, such that power is transferred from the power source to the light assembly. The electric power receiving arrangement includes at least one of electrical contacts which contact the conductive fabric or the conductive foam, or an inductive receiver coil that inductively couples with the inductive transmitter coil.

8 Claims, 5 Drawing Sheets

(51) Int. Cl.
  *B60Q 3/51*   (2017.01)
  *B60R 13/02*  (2006.01)
  *B32B 5/02*   (2006.01)
  *B32B 5/24*   (2006.01)

(56) References Cited

U.S. PATENT DOCUMENTS

| | | | |
|---|---|---|---|
| 5,895,115 A | 4/1999 | Parker et al. | |
| 6,380,683 B1 * | 4/2002 | Kahn | H01R 13/6205 |
| | | | 315/56 |
| 6,467,937 B2 | 10/2002 | Nagata et al. | |
| 6,666,571 B2 | 12/2003 | Becher et al. | |
| 7,249,864 B2 * | 7/2007 | Smith | F21S 6/006 |
| | | | 362/183 |
| 7,731,403 B2 | 6/2010 | Lynam et al. | |
| 7,860,626 B2 | 12/2010 | Breed | |
| 8,348,492 B2 * | 1/2013 | Mier-Langner | H01R 25/147 |
| | | | 362/147 |
| 8,367,950 B2 | 2/2013 | Ozaki et al. | |
| 8,680,774 B2 * | 3/2014 | Van Hoof | F21V 21/35 |
| | | | 362/648 |
| 8,985,813 B2 * | 3/2015 | Zaderej | F21S 2/005 |
| | | | 362/648 |
| 9,146,009 B2 * | 9/2015 | Zhu | F21L 4/08 |
| 9,155,170 B2 * | 10/2015 | Shah | G05B 15/02 |
| 9,193,098 B2 | 11/2015 | Oeuvrard et al. | |
| 9,311,831 B2 | 4/2016 | Henshue et al. | |
| 9,403,477 B2 | 8/2016 | Richard et al. | |
| 9,738,219 B1 | 8/2017 | Salter et al. | |
| 9,765,954 B2 * | 9/2017 | Zaderej | F21S 6/003 |
| 9,958,138 B2 | 5/2018 | Salter et al. | |
| 10,197,255 B2 * | 2/2019 | Chien | F21V 21/35 |
| 10,236,627 B1 * | 3/2019 | Krize | H01R 24/76 |
| 10,813,201 B1 * | 10/2020 | Ghahramani | H05B 47/115 |
| 2010/0195337 A1 | 8/2010 | Heite et al. | |
| 2015/0298601 A1 | 10/2015 | Bott et al. | |
| 2020/0408395 A1 * | 12/2020 | Becker | F21V 17/105 |

FOREIGN PATENT DOCUMENTS

| | | |
|---|---|---|
| CN | 210006454 | 1/2020 |
| EP | 1561645 | 8/2005 |
| WO | 2010058671 | 5/2010 |

* cited by examiner

LIGHTING SYSTEM HAVING LIGHT ASSEMBLY REMOVABLY COUPLED TO POWERING SURFACE ASSEMBLY

BACKGROUND

Vehicle lights are typically mounted at a predetermined static location on the vehicle, which is necessary in order to connect power supply wires to the vehicle lights from a vehicle power source. When operated, the vehicle lights provide illumination in a static direction from the static location where they are mounted. Dome lights are typically mounted at the center of a ceiling of a passenger compartment of the vehicle. When operated, the dome light provides illumination that is transmitted from the static location of the dome light at the center of the ceiling, and is emitted in a static direction to illuminate a static portion of the passenger compartment. If more intense lighting is desired at a portion of the passenger compartment that is not sufficiently illuminated by the dome light, then a separate light, for example a hand-held flashlight may be needed for this purpose.

BRIEF DESCRIPTION

According to one aspect, a light assembly includes a light source; a connector including a magnet, hook and/or loop connectors, or combinations thereof, which are configured to removably attach the light assembly to a surface; and an electric power receiving arrangement in electrical communication with the light source, the electric power receiving arrangement being configured to receive electric power provided from a power source that is external of the light assembly and transmitted through the surface, and to transmit the power to the light source to cause the light source to emit light. The electric power receiving arrangement includes electrical contacts on an exposed surface of the light assembly and configured to receive the power by contacting a conductor in or under the surface and in electrical communication with the power source, an inductive receiver coil configured to contactlessly receive the power by inductively coupling with an inductive transmitter coil on or under the surface and in electrical communication with the power source, or combinations thereof.

According to another aspect, an assembly includes a substrate, an electric power transfer arrangement connected to the substrate, in electrical communication with a power source, and configured to transfer electric power from the power source to an electrical load, which electrical load is external to the assembly and removably connected to a surface of the assembly by hook and loop connectors, a magnet, or combinations thereof. The electric power transfer arrangement includes conductive fabric configured to transfer the power to the electrical load by contact with electrical contacts of the electrical load, conductive foam configured to transfer the power to the electrical load by contact with the electrical contacts of the electrical load, an inductive transmitter coil configured to contactlessly transfer the power to the electrical load by inductively coupling with an inductive transmitter coil of the electrical load, or combinations thereof.

According to another aspect, a lighting system includes a surface assembly and a light assembly configured to be removably attached to a surface of the surface assembly for the transmission of electric power from the surface assembly to the light assembly. The surface assembly includes a substrate; and an electric power transfer arrangement connected to the substrate, in electrical communication with a power source external to the light assembly, and configured to transfer the electric power from the power source to the light assembly in order for the light assembly to consume the power. The electric power transfer arrangement includes conductive fabric, conductive foam, an inductive transmitter coil, or combinations thereof. The light assembly includes a light source; a connector including a magnet, hook and/or loop connectors, or combinations thereof, and configured to removably attach the light assembly to the surface of the surface assembly; and an electric power receiving arrangement in electrical communication with the light source. The electric power receiving arrangement is configured to transmit the power from the electric power transfer arrangement to the light source to cause the light source to emit light. The electric power receiving arrangement includes electrical contacts on an exposed surface of the light assembly and configured to receive the power from the electric power transfer arrangement by contacting the conductive fabric or the conductive foam, an inductive receiver coil configured to contactlessly receive the power from the electric power transfer arrangement by inductively coupling with the inductive transmitter coil, or combinations thereof.

DETAILED DESCRIPTION

A lighting system includes a surface assembly and a light assembly. The surface assembly includes an electric power transfer arrangement that is connected to a power source, and the light assembly includes an electric power receiving arrangement. The light assembly can be removably attached at different locations on the surface assembly, and when this is done, electrical communication is established between the electric power transfer arrangement and the electric power receiving arrangement to thereby allow for the transfer of electric power from the power source, through the surface assembly, and to the light assembly. The electric power transfer arrangement includes conductive fabric, conductive foam, and/or an inductive transmitter coil. The electric power receiving arrangement includes electrical contacts which contact the conductive fabric or the conductive foam, and/or an inductive receiver coil that inductively couples with the inductive transmitter coil. The light assembly can be attached at different locations on the surface assembly, because the electric power transfer arrangement may be arranged under an entire surface (or substantially the entire surface, e.g. except for edge portions) of the surface assembly. This allows electrical communication to be established between the light assembly and the surface assembly no matter what location the light assembly is arranged on the surface of the surface assembly.

Because the light assembly can be attached at different locations on the surface assembly yet still be powered, the lighting system provides lighting options that are customizable based on the needs of a user for particular situations. If the lighting system is provided in a vehicle, the light assembly may be attached at desired locations on the surface assembly to provide customizable lighting to desired areas of the vehicle, thus addressing limitations of convention vehicle lights, which have a fixed location in a vehicle and thus emit light from only that fixed location.

Referring to the figures, a lighting system 2 includes a surface assembly 4 and a light assembly 6 that draws electric power from the surface assembly 4, yet is moveable with respect to a surface 8 of the surface assembly 4.

The light assembly 6 is configured to be removably attached to the surface 8 of the surface assembly 4 for the transmission of electric power from a power source 22, through the surface 8 and via the surface assembly 4, and to the light assembly 6. Such transfer of power allows the light assembly 6 to emit light. For this purpose, the surface assembly 4 includes an electric power transfer arrangement 20 connected to the power source 22, and the light assembly 6 includes an electric power receiving arrangement 30. When the light assembly 6 is removably attached to the surface assembly 4, electrical communication is established between the electric power transfer arrangement 20 and the electric power receiving arrangement 30, which allows the transfer of electric power from the power source 22, through the electric power transfer arrangement 20 of the surface assembly 4, and to the electric power receiving arrangement 30 of the light assembly 6.

The light assembly 6 may be removably attached to the surface assembly 4 at different desired locations along the surface 8, yet still maintain the electrical communication between the electric power transfer arrangement 20 and the electric power receiving arrangement 30 to thereby allow the light assembly 6 to provide emitted light at these desired locations. The placement location of the light assembly 6 on the surface 8 of the surface assembly 2 is thus customizable based on the needs of a user, and thus may be utilized to provide light as needed for a particular situation. The surface assembly 4 may be included as part of a vehicle, home, office, or other location, and in indoor or outdoor applications.

In a non-limiting embodiment, the surface assembly 4 is included in a vehicle, e.g. as part of a roof assembly of the vehicle and may thus define a ceiling of the passenger compartment of the vehicle. The light assembly 6 may be placed at almost any location on the ceiling of the vehicle so as to act as a dome light. Because of the ability of the light assembly 6 to be attached to different locations on the surface 8 and still maintain the electrical communication between the electric power transfer arrangement 20 and the electric power receiving arrangement 30, the light assembly 6 may provide customizable lighting to different portions of the passenger compartment as desired by the user.

The surface assembly 4 may be included in other areas of the vehicle, e.g. on a door, seat, interior or exterior panel including the instrument panel, trunk, or engine compartment. Thus, no separate light fixture housing (e.g. a convention dome light or trunk light) is required to be permanently incorporated into these areas of the vehicle. Instead, the removably attached light assembly 6 can be used to illuminate different areas of the vehicle as desired, and is not limited to illuminating a predefined area of the vehicle as are conventional domes lights and other conventional vehicle lights.

The surface assembly 4 may have a layered construction and include a substrate 10, a scrim layer 12 covering the substrate 10, a foam layer 14 covering the scrim layer 12, a fabric layer 16 (also referred to herein as "cover layer 16" or "fabric cover layer 16") covering the foam layer 14, the electric power transfer arrangement 20, and/or other layers, coatings, or adhesive layers. However, not all of these components are required to be included in the surface assembly 4. The various layers of the surface assembly may be attached to each other, or bonded to each other, e.g. by adhesive. The electric power transfer arrangement 20 may be connected to the substrate 10 or a portion thereof, either directly contacting the substrate 10 or through various other layers of the surface assembly 4. The electric power transfer arrangement 20 may cover the substrate 10. Other than specifically described herein, the substrate 10, the scrim layer 12, the foam layer 14, and the fabric layer 16 are not particularly limited, and may include known materials and configurations such as urethane foam in the foam layer 14.

The surface 8 of the surface assembly 4 may be flat or contoured, and may be continuous and uninterrupted. When the surface assembly 4 is used in a vehicle to define a ceiling in a vehicle, the light assembly 6 may be used as a dome light. Thus, the surface 8 may not need to include a housing for a conventional dome light. Instead, the lighting system 2 thus allows for interior lighting of the vehicle while providing a clean, continuous, and uninterrupted appearance to the surface 8. The lighting system 2 may also be used in conjunction with conventional vehicle lights, including conventional dome lights to supplement these.

The surface assembly 4 includes the electric power transfer arrangement 20, which may include a conductive foam as the foam layer 14, a conductive fabric as the fabric layer 16, or an inductive transmitter coil 18. Although the inductive transmitter coil 18 is shown to be included in the foam layer 14 and covered by the cover layer 16, this is not required, and the inductive transmitter coil 18 can be included almost anywhere in or between the various layers of the surface assembly 4, such as on the surface 8 of the surface assembly 4.

The electric power transfer arrangement 20 is connected to the electric power source 22 for providing electric power thereto. The power source 22 is external to the light assembly 6 and may be external to the surface assembly 4. The power source 22 may be a power source of a vehicle, e.g. a battery and/or alternator of the vehicle. However, the power source 22 is not limited to these, and can also include a solar cell, a generator, a power main, or other sources of direct current or alternating current that provide electric power. As shown in FIGS. 11-14, the connection between the electric power transfer arrangement 20 and the electric power source 22 may be accomplished via a harness 36, such as a vehicle harness, that may connect to the surface assembly 4 by a plug or other quick connection configuration during assembly for example.

The light assembly 6 may include a housing 24, a light source 26, a connector 28, and/or the electric power receiving arrangement 30 in electrical communication with the light source 26. However, not all of these components are required to be included in the light assembly 6.

The housing 24 is not particularly limited, and may be made from one or more materials and/or components, at least one of which is transparent, translucent or includes an aperture so as to allow light emitted by the light source 26 to be transmitted through the housing 24 to provide illumination exterior of the housing 24. The shape of the housing 24 is not particularly limited, and may include a top surface 46 to mate with the surface 8 of the surface assembly 4, both of which may be flat surfaces for example. The housing 24 may otherwise have a dome-shaped configuration as shown in the figures, or have other configurations as desired.

The light source 26 may be arranged inside the housing 24 if included, although this is not required. The light source 26, which is an electrical load, is external to the surface assembly 4 since it is included in the light assembly 6. The light source 26 is not particularly limited, and may include a luminescent light source (e.g. a light emitting diode (LED), a fluorescent light source), an incandescent light source (e.g., a regular incandescent light bulb with a heated filament, a halogen light source), an electric arc light source, a gas discharge light source, a high-intensity discharge light source, or combinations thereof. The light source 26 is electrically connected to the electric power receiving arrangement 30 via electrical pathways 50, which transmit the power from the electric power receiving arrangement 30 to the light source 26.

The surface assembly 4, via the electric power transfer arrangement 20, transfers the power from the power source 22 to the electric power receiving arrangement 30 of the light assembly 6, which power is then communicated to the light source 26 to cause the light source to emit light. A switch 48 may be included as part of one or both of the surface assembly 4 or the light assembly 6 to make or break an electrical path in these components to allow or not allow the transmission of the power from the power source 22 to the light source 26, and thus to change the light source 26 between an inactive state, where the light source 26 is not receiving the power and thus does not emit light, to an active state, where the light source 26 is receiving the power and thus does emit light. In other words, the switch 48 is operable to selectively allow or stop transmission of the power form the power source 22 to the light source 26.

Figure 7:
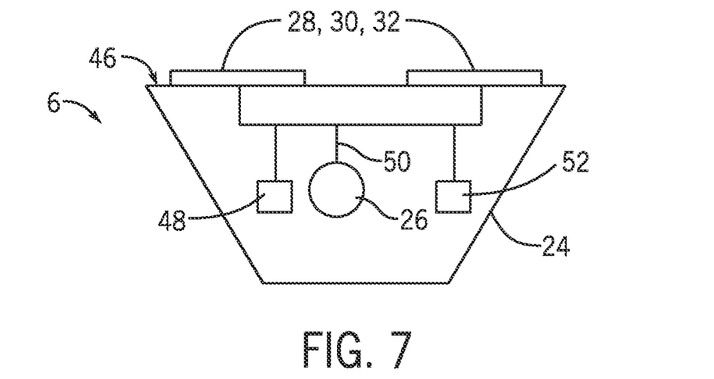
FIG. 7 is a schematic cross-sectional view of another light assembly according to the present subject matter.
Figure 9:
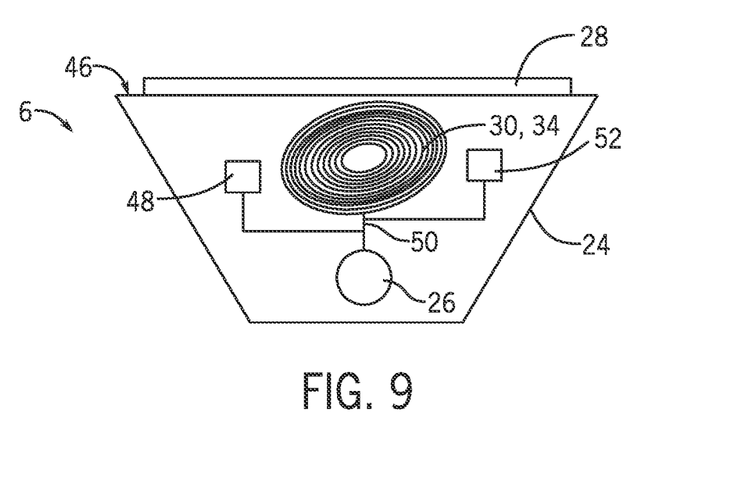
FIG. 9 is a schematic cross-sectional view of another light assembly according to the present subject matter.

As schematically depicted in FIGS. 1-4, the surface assembly 4 includes a switch 48 for breaking an electrical path between the power source 22 and the surface assembly 4. In these embodiments, the light assembly 6 may or may not include a switch of its own. If the lighting system 2 is included in a vehicle, this switch 48 of the surface assembly 4 may be operated from a control panel of the vehicle. As schematically depicted in FIGS. 5, 7, 9, the light assembly 6 includes a switch 48 for making or breaking an electrical path between the electric power receiving arrangement 30 and the light source 26. In these embodiments, the surface assembly 4 may or may not include a switch of its own. If the lighting system 2 is included in a vehicle, this switch 48 of the light assembly 6 may be arranged on an exterior surface of the light assembly 6 that is accessible by a user for operating the switch 48 when the light assembly 6 is attached to the surface assembly 4.

The light assembly 6 may also include a battery 52 for storing power and for providing power to the light source 26. The battery 52 may be integral with the light assembly 6, e.g. arranged inside the housing 24. The battery 52 may be rechargeable, and may be recharged via the power received from the electric power receiving arrangement 30. The battery 52 may store the power for use by the light source 26. The battery 52 may be recharged when the light source 26 is not emitting light and when the electrical communication is established between the electric power transfer arrangement 20 and the electric power receiving arrangement 30. Because the battery 52 stores power and can provided it to the light source 26, the light source 26 may then be operated to emit light even in the event power is not being supplied from the surface assembly 4 to the light assembly 6. This may occur when the light assembly 6 is separated from the surface assembly 4 such as if the light assembly 6 is removed by a user from the surface assembly 4. In this case, the light assembly 6 can act as a flash light to autonomously supply light apart from the surface assembly 4. If included as part of a vehicle, the light assembly 6 including the battery 52 can then be removed from the surface assembly 4 and used to illuminate portions of the vehicle distant from the surface assembly 4 or even used to illuminate locations remote from the vehicle, such as areas outside the vehicle. The battery 52 can also be utilized to provide power to the light source 26 in the event the power source 22 is inoperable or not operating to provide power.

The connector 28 of the light assembly 6 is not particularly limited other than as described herein. The connector 28 operates to removably attach the light assembly 6 to the surface assembly 4. The connector 28 may include a magnet, hook and/or loop connectors (e.g. Velcro®), multiples of these, or combinations thereof arranged on an exposed surface 46 (i.e. top surface) of the light assembly 6. The light assembly 6 may be removably attached to the surface assembly 4 by only the connector 28.

If the connector 28 includes a magnet, this magnet may removably attach the light assembly 6 to the surface assembly 4 by magnetic attraction between the magnet and a magnetic material included in the substrate 10 or a magnetic material included in other layers of the surface assembly 4. In a non-limiting embodiment, the substrate 10 may include ferrous metals or other materials that are attracted by the magnet of the connector 28. The connector 28 may include one or more magnets. If the connector 28 includes the hook and/or loop connectors, these may removably attach the light assembly 6 to the surface assembly 4 by interacting with the material of the surface 8. The surface 8 may be defined by the exposed fabric cover layer 16, which may be fabric that binds with the hook and/or loop connectors. The connector 28 may include one or more areas of the hook and/or loop connectors.

As depicted in FIGS. 5, 6, 9-12, and 14, the connector 28 includes a single ring-shaped magnet or a single ring-shaped piece of hook or loop connectors. A connector 28 having a different shape and more than one connector 28 can be used.

The electric power receiving arrangement 30 of the light assembly 6 may include electrical contacts 32, an inductive receiver coil 34, or combinations thereof. As depicted in FIGS. 5, 6, 11, and 12, the electrical contacts 32 are two electrically conductive prongs extending away from the exposed top surface 46 of the light assembly 6. The two prongs may be pyramid shaped or have another shape, and may be electrically connected as positive and negative leads, respectively, to the light source 26. Different numbers and shapes may be used for the electrical contacts 32. The two prongs as electrical contacts 32 can be made of electrically conductive metal or other material that is electrically conductive.

Figure 8:
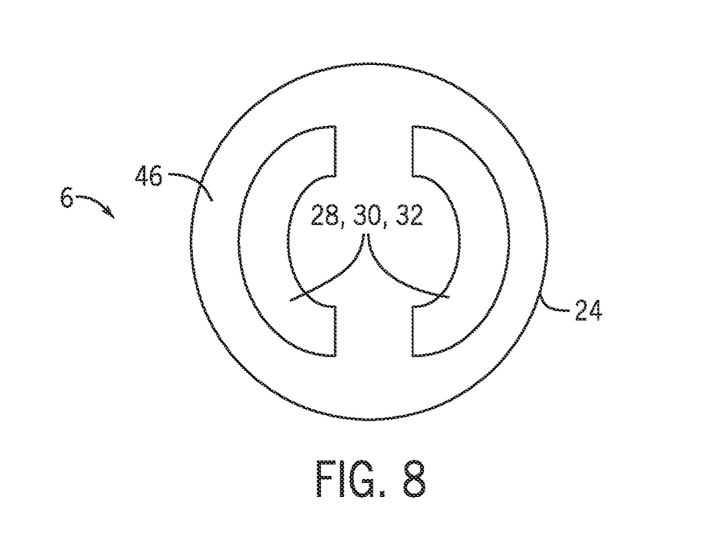
FIG. 8 is a schematic top view of the light assembly of FIG. 7.
Figure 13:
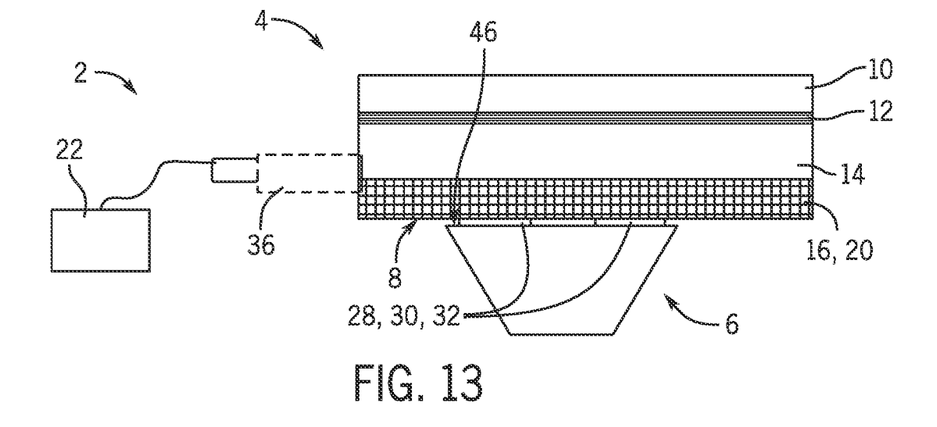
FIG. 13 is a schematic side view of another lighting system according to the present subject matter.

As depicted in FIGS. 7, 8, and 13, the electrical contacts 32 may include two areas of conductive hook and/or loop connectors, which two areas may each have a shape of a portion of a ring, and be electrically connected as positive and negative leads, respectively, to the light source 26. This configuration may be utilized when the hook and/or loop connectors are not only used as the electrical contacts 32 to establish an electrical connection with surface assembly 4, but also used as the connector 28 to attach the light assembly 6 to the surface assembly 4. Conductivity of the hook and/or loop connectors may be accomplished in various and non-limited ways, including by having a coating of conductive material on the hook and/or loop connectors, having conductive thread arranged in or on the hook and/or loop connectors, or by other strategies. More and different shaped areas of conductive hook and/or loop connectors can be used.

Figure 10:
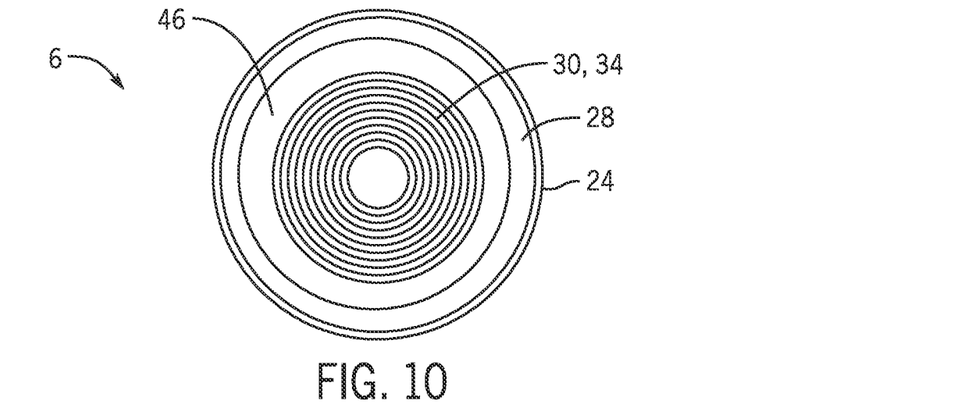
FIG. 10 is a schematic top view of the light assembly of FIG. 9.
Figure 14:
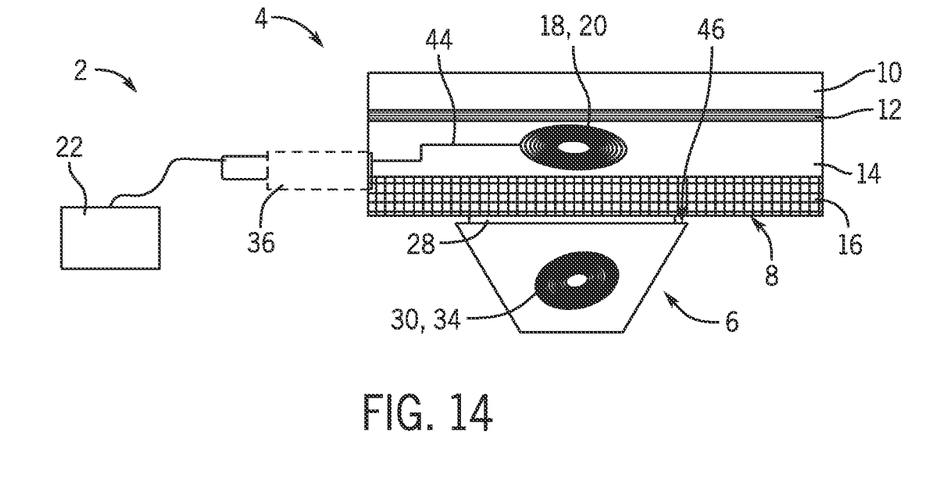
FIG. 14 is a schematic side view of another lighting system according to the present subject matter.

As depicted in FIGS. 9, 10, and 14, the electric power receiving arrangement 30 includes the inductive receiver coil 34, which is electrically connected to the light source 26.

With reference to FIGS. 1, 5, 6, and 11, the electric power transfer arrangement 20 includes conductive foam, which may be included as the foam layer 14 of the surface assembly 4. The conductive foam is not particularly limited, and may include a matrix of foam material with conductive particles dispersed in the matrix, a foam material with a conductive layer therein or thereon, a foam material that is itself conductive, or other configurations.

Figure 12:
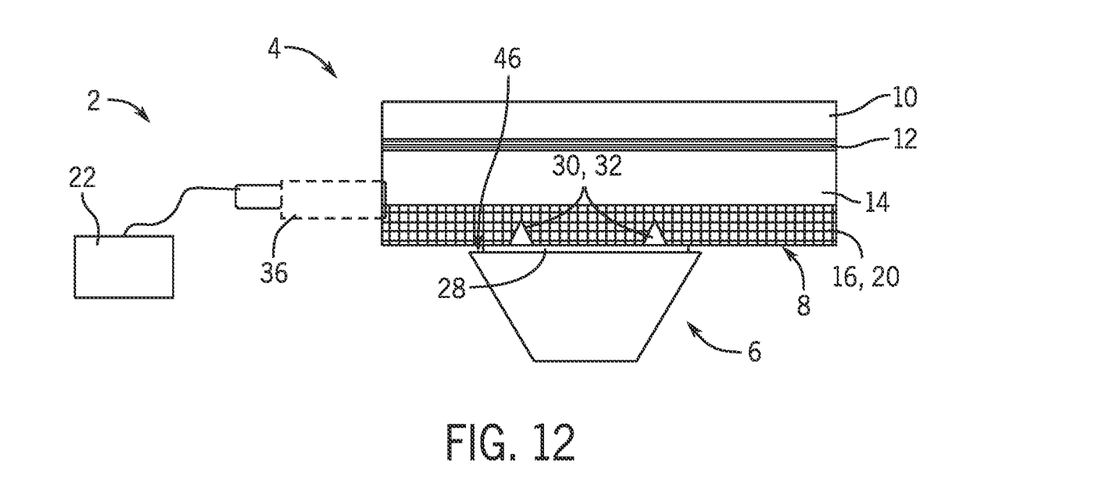
FIG. 12 is a schematic side view of another lighting system according to the present subject matter.

The conductive foam layer 14 is connected to the power source 22 (FIG. 1), which may be accomplished using the harness 36 (FIG. 12). For the lighting system 2 to emit light, the light assembly 6 (FIGS. 5, 6) is removably connected to the surface 8 of the surface assembly 4 (FIG. 12) at a desired location along the surface 8 via the connector 28, which may include a magnet, or hook and/or look connectors. As depicted, the conductive foam layer 14 extends over all of the substrate 10, however, this is not required. The light assembly 6 can thus be connected to the surface assembly 4 at any location on the surface 8 and still receive power from the power source 22 via the conductive foam layer 14. The conductive foam layer 14 is an electrical conductor, e.g. arranged under the fabric layer 16, for the conduction of electric power to the light assembly 6.

Figure 11:
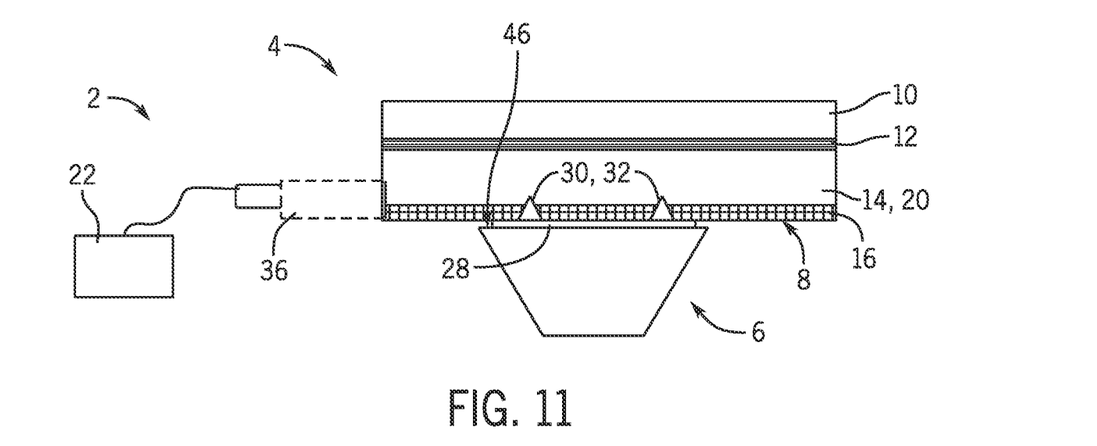
FIG. 11 is a schematic side view of a lighting system according to the present subject matter.

As shown in FIG. 11, the light assembly 6 includes two electrical contacts 32 in the form of two prongs extending from the same top surface 46 of the light assembly 6 that includes the connector 28 thereon. When the light assembly 6 is connected to the surface assembly 4 by the connector 28, the two prongs may penetrate through the cover layer 16 to contact the conductive foam layer 14 and thus establish electrical communication between the surface assembly 4 and light assembly 6 for the transfer of power from the power source 22, through the surface 8 (i.e. through a thickness of the cover layer 16 via the two prongs), and to the light assembly 6. The two prongs may be pointed as shown, and thus able to penetrate through the fabric cover layer 16 to establish electrical communication with the conductive foam layer 14. In a non-limiting embodiment, the two prongs do not aid in attaching the light assembly 6 to the surface assembly 4. In other words, without the connector 28, the two prongs are not able to attach the light assembly 6 to the surface assembly 4.

With reference to FIGS. 2, 3, 5-8, 12, and 13 the electric power transfer arrangement 20 includes conductive fabric as the cover layer 16. The conductive fabric is not particularly limited, and may include a fabric having conductive threads or wires 38 therein that extend between positive and negative bus bars 40, 42 connected to the power source 22; conductive threads woven into and among conventional threads; a layer of conductive material in or on the fabric; or other configurations.

The conductive fabric layer 16 is connected to the power source 22, and this may be accomplished using the harness 36 (FIGS. 12, 13). The light assembly 6 is removably connected to the surface 8 of the surface assembly 4 at a desired location along the surface 8. For this purpose, the connector 28 may include the magnet, the hook and/or loop connectors, or combinations thereof.

Figure 5:
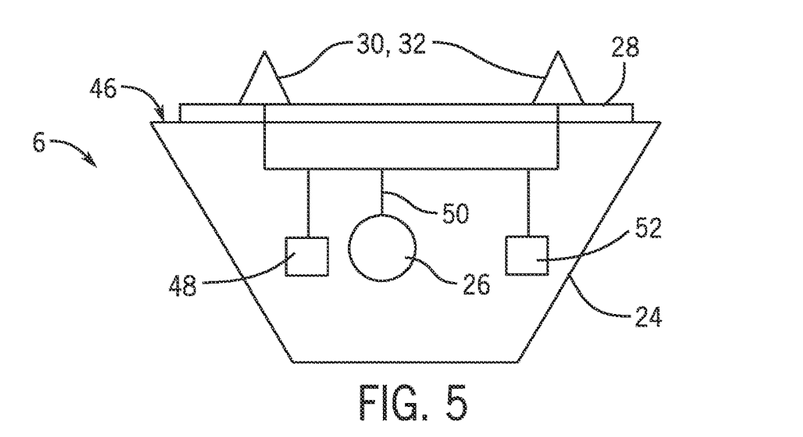
FIG. 5 is a schematic cross-sectional view of a light assembly according to the present subject matter.
Figure 6:
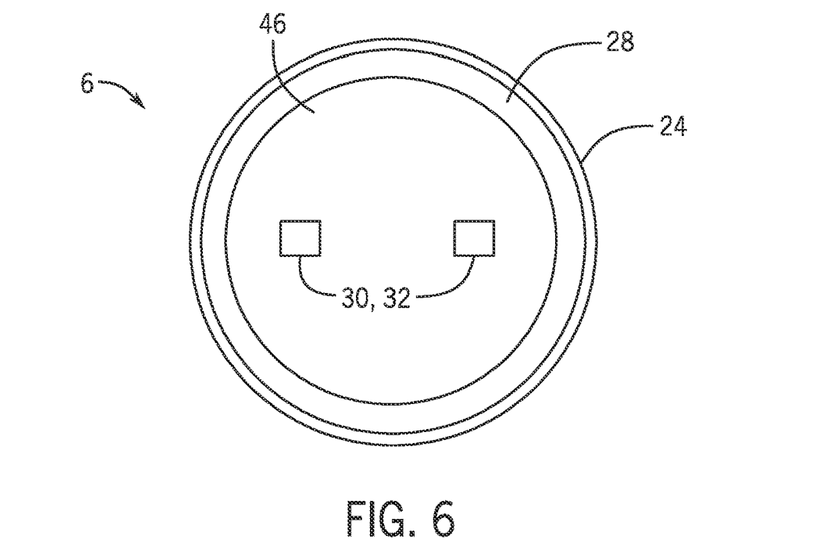
FIG. 6 is a schematic top view of the light assembly of FIG. 5.

With reference to FIGS. 5, 6, and 12, the light assembly 6 includes two electrical contacts 32 in the form of the two prongs. When the light assembly 6 is connected to the surface assembly 4 (FIG. 12), the two prongs contact the conductive fabric layer 16 to thus establish electrical communication between the surface assembly 4 and light assembly 6. This allows for the transfer of power from the power source 22, through the surface 8 (i.e. through the material of the conductive fabric cover layer 16 that defines the surface 8), and to the two prongs of the light assembly 6.

With reference to FIGS. 7, 8, and 13, the light assembly 6 does not include the two prongs as the electrical contacts 32, but instead may include conductive hook and/or loop connectors as the electrical contacts 32. When the light assembly 6 is connected to the surface assembly 4 (FIG. 12), the conductive hook and/or loop connectors contact the conductive fabric layer 16 to thus establish electrical communication between the surface assembly 4 and light assembly 6. This allows for the transfer of power from the power source 22, through the surface 8 (i.e. through the material of the conductive fabric cover layer 16 that defines the surface 8), and to the conductive hook and/or loop connectors of the light assembly 6.

When the light assembly 6 is connected to the surface assembly 4 (i.e. by a magnet or by hook and/or look connectors), the electrical contacts 32 (i.e. conductive prongs, or conductive hook and/or loop connectors) contact the conductive fabric layer 16 to thus establish electrical communication between the surface assembly 4 and light assembly 6 for the transfer of power from the power source 22, through the surface 8, and to the light assembly 6. When the prongs are used as the electrical contacts 32, the prongs contact the conductive fabric cover layer 16 (FIG. 12). When the conductive hook and/or loop connectors are used as the electrical contacts 32, the conductive hook and/or loop connectors contact the conductive fabric cover layer 16 and also removably attach to the conductive fabric cover layer 16 (FIG. 13). The conductive fabric layer 16 is thus an electrical conductor for the conduction of electric power to the light assembly 6.

With reference to FIGS. 4, 9, 10, and 14 the electric power transfer arrangement 20 includes inductive transmitter coil 18 and the electric power receiving arrangement 30 includes the inductive receiver coil 34. The inductive coils 18, 34 are not particularly limited, and each may include a spiraled winding or other configuration formed from a conductive trace, a wire, an etching, or other conductive path of conductive material. The coils 18, 34 may be formed by printing a conductive ink, by a non-printed technique such as etching, or other manufacturing technique. The coils 18, 34 may be flexible. The surface assembly 4 may include more than one inductive transmitter coil 18 arranged along the surface, or the transmitter coil 18 may be relatively large compared to the area of the surface 8, such that the light assembly 6 can be placed anywhere on the surface 8 and still receive power via inductive coupling between the two coils 18, 34

The inductive receiver coil 34 is connected to the power source 22, and is configured to be inductively coupled to the inductive transmitter coil 18 for inductively transmitting (i.e. wirelessly or contactlessly transmitting) power from the transmitter coil 18, through the surface 8 (i.e. through a thickness of the cover layer 16 via inductive coupling), and to the receiver coil 34. The inductive transmitter coil 18 may be arranged in the foam layer 14 (FIGS. 4 and 14), or may be arranged at other locations with respect to the various layers of the surface assembly 4, such as in or on the substrate 10, scrim layer 12, and/or fabric layer 16.

When power from the power source 22 is delivered to the inductive transmitter coil 18, the inductive transmitter coil 18 is inductively coupled with the inductive receiver coil 34, and thus contactlessly transmits power by inductive coupling to the inductive receiver coil 34, which contactlessly receives the power and delivers the power (i.e. electric current) to the light source 26 to be consumed by the light source 26. That is, the transmitter coil 18 and the receiver coil 34 are configured such that a change in current through the transmitter coil 18 induces, via inductive coupling, a voltage across the ends of the receiver coil 34 through electromagnetic induction. A changing current through the transmitter coil 18 creates a changing magnetic field around it under the principles of Ampere's circuital law. The changing magnetic field induces an electromotive force (EMF or voltage) in the receiver coil 34 under the principles of Faraday's law of induction. The amount of inductive coupling between the transmitter coil 18 and the receiver coil 34 may be measured by their mutual inductance. The coupling between the transmitter coil 18 and the receiver coil 34 may be achieved by positioning the transmitter coil 18 and the receiver coil 34 opposite each other and on or near a common axis. Such inductive coupling may be achieved with or without having anything arranged between the coils 18, 34, e.g. the fabric cover layer 16 being between the coils 18, 34.

The inductive coupling between the transmitter coil 18 and the receiver coil 34 may be attained or increased by arranging them to be separated by a gap that is equal to or smaller than a diameter of the transmitter coil 18 or a diameter of the receiver coil 34, and where the transmitter coil 18 and the receiver coil 34 are arranged on or near a common axis. This relative configuration of the coils 18, 34 may allow the induced magnetic field of the transmitter coil 18 to pass to and through the receiver coil 34 by a short-range near-field non-radiative inductive coupling. The coils 18, 34 may or may not be in contact with each other, which contact may be accomplished by having the transmitter coil 18 being arranged on the surface 8 of the surface assembly 4, and the having the receiver coil 34 being arranged on the top surface 46 of the light assembly 6. Alternatively, the coils 18, 34 may be spaced such as to allow for a mid-range near-field resonant inductive coupling (which has the transmitter coil 18 and the receiver coil 34 separated by a gap that is between 1 and 10 times the diameter of the transmitter coil 18 or a diameter of the receiver coil 34), or to allow for a far-field radiative wireless power transfer (which has the transmitter coil 18 and the receiver coil 34 separated by a gap that is greater than 10 times the diameter of the transmitter coil 18 or a diameter of the receiver coil 34).

Figure 1:
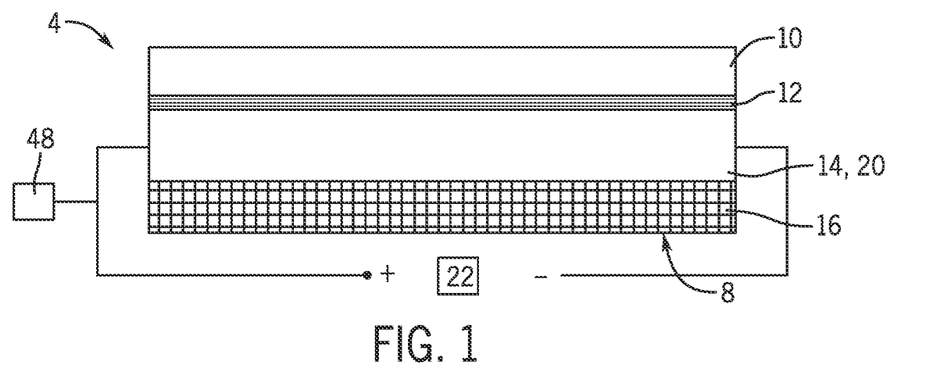
FIG. 1 is a schematic cross-sectional view of a surface assembly according to the present subject matter.
Figure 2:
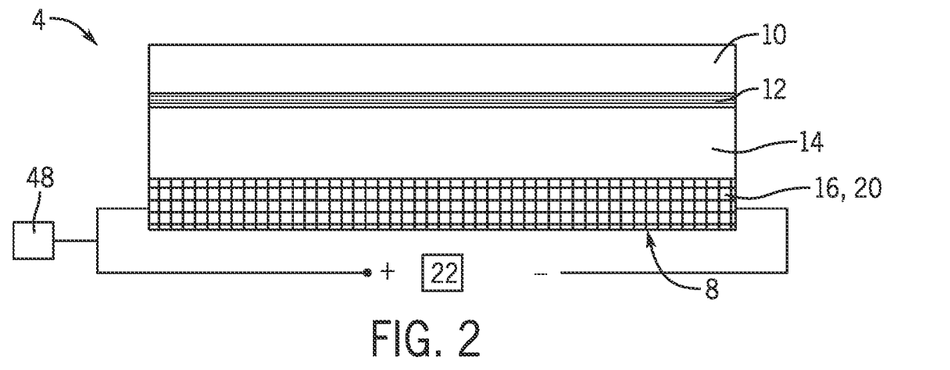
FIG. 2 is a schematic cross-sectional view of another surface assembly according to the present subject matter.
Figure 3:
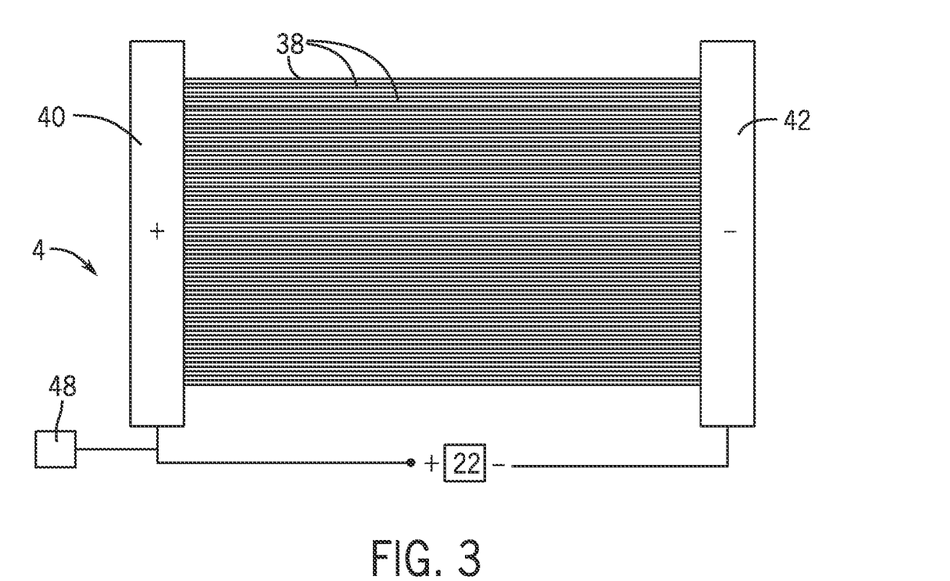
FIG. 3 is a schematic detailed bottom view of conductive threads of the surface assembly of FIG. 2.
Figure 4:
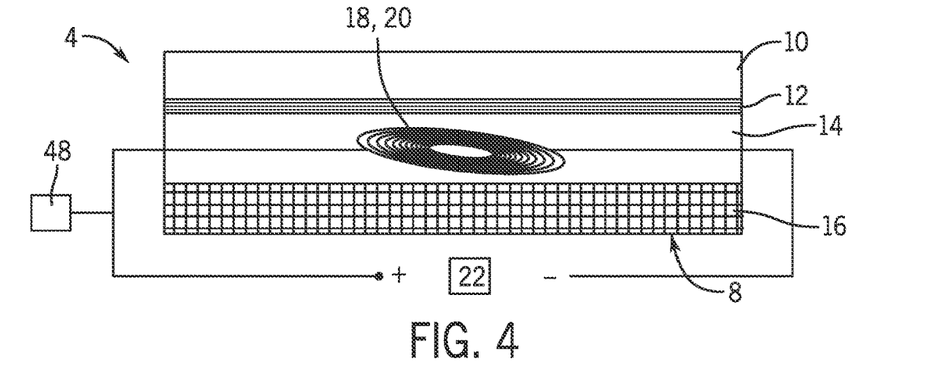
FIG. 4 is a schematic cross-sectional view of another surface assembly according to the present subject matter.

The transmitter coil 18 is connected to the power source 22, and this may be accomplished using the harness 36 (FIGS. 4, 14). Power from the power source 22 may be delivered to the transmitter coil 18 by a path 44 extending in the surface assembly 4 between the transmitter coil 18 and the harness 36. When the light assembly 6 is attached to the surface assembly 4 (FIG. 14), the inductive coils 18, 34 may be spaced from each other by a distance that allows for inductive coupling between the coils 18, 34.

The light assembly 6 with the receiver coil 34 is removably connected to the surface 8 of the surface assembly 4 at a desired location along the surface 8. For this purpose, the connector 28 may include the magnet, the hook and/or loop connectors, or combinations thereof.

With reference to FIGS. 9 and 10, the light assembly 6 does not include electrical contacts 32 for establishing electrical communication between the surface assembly 4 and the light assembly 6, but instead includes the receiver coil 34. When the light assembly 6 is connected to the surface assembly 4 by the conductive connector 28 (e.g. magnet, or hook or loop connectors), the coils 18, 34 inductively couple with each other, and thus establish electrical communication between the surface assembly 4 and light assembly 6 for the transfer of power from the power source 22 to the light assembly 6.

The lighting system 2 provides customizable lighting options that allow for the emission of light from different desired locations on the surface 8 of the surface assembly 4. The lighting system 2 may include more than one light assembly 6 for attachment to the surface assembly 4, more than one surface assembly 4 for attachment with the light assembly 6, or both. Thus the lighting system 2 is modular and can be added to by including additional surface assemblies 4 and/or lighting assemblies 6. If used in a vehicle, the vehicle could include a first surface assembly 4 as part of a roof assembly of the vehicle, thus defining a ceiling in a passenger compartment of the vehicle, and a second surface assembly 4 as part of a trunk of the vehicle, thus defining an interior surface of the trunk. One or more light assemblies 6 could be arranged on these two surface assemblies to provide customizable lighting to the passenger compartment and the trunk. Other surface assemblies 4 could be arranged at other location on the vehicle to provide further customizable lighting options.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A lighting system including:
    a surface assembly including a substrate and an electric power transfer arrangement connected to the substrate, and in electrical communication with an external power source, the electric power transfer arrangement including at least one of conductive fabric or conductive foam;
    a light assembly configured to be removably attached to a surface of the surface assembly and to receive electric power transferred by the surface assembly from the external power source, the light assembly including:
        a light source;
        a connector including at least one of a magnet or hook and loop connectors, the connector configured to removably attach the light assembly to the surface of the surface assembly; and an electric power receiving arrangement in electrical communication with the light source, the electric power receiving arrangement configured to transmit the power from the electric power transfer arrangement to the light source to cause the light source to emit light, the electric power receiving arrangement including electrical contacts on an exposed surface of the light assembly, the electrical contacts configured to receive the power from the electric power transfer arrangement by contacting the conductive fabric or the conductive foam.

2. The lighting system according to claim 1, further including a switch operable to selectively allow or stop transmission of the power from the power source to the light source.

3. The lighting system according to claim 1, wherein:

the connector includes the hook and loop connectors and the hook and loop connectors are conductive;

the conductive hook and loop connectors define the electric power receiving arrangement; the electric power transfer arrangement includes the conductive fabric;

an exposed cover layer of the surface assembly includes the conductive fabric; and when the light assembly is attached to the surface assembly, the conductive hook and loop connectors form an electrical connection with the conductive fabric.

4. The lighting system according to claim 1, wherein:

the surface assembly further includes an exposed cover layer;

the electric power transfer arrangement includes the conductive foam;

the cover layer of the surface assembly covers the conductive foam; and when the light assembly is attached to the cover layer, the electrical contacts penetrate the cover layer and establish an electrical connection with the conductive foam.

5. The lighting system according to claim 1, wherein:

the electric power transfer arrangement includes the conductive fabric as an exposed cover layer of the surface assembly; and when the light assembly is attached to the cover layer, the electrical contacts form an electrical connection with the conductive fabric.

6. The lighting system according to claim 1, wherein:

the electric power receiving arrangement includes the inductive receiver coil;

the electric power transfer arrangement includes the inductive transmitter coil; and when the light assembly is attached to the surface assembly, the inductive receiver coil is inductively coupled with the inductive transmitter coil.

7. The lighting system according to claim 1, further comprising the power source.

8. A roof assembly of a vehicle comprising the lighting system according to claim 1.

* * * * *